United States Patent
Sharoyan et al.

(10) Patent No.: US 10,844,544 B2
(45) Date of Patent: Nov. 24, 2020

(54) METHOD OF MEASURING HYDROPHOBIC CONTAMINANTS IN A PULP SLURRY OR A PAPERMAKING SYSTEM

(71) Applicant: SOLENIS TECHNOLOGIES, L.P., Wilmington, DE (US)

(72) Inventors: Davit E. Sharoyan, Hockessin, DE (US); Fushan Zhang, Hockessin, DE (US); Matthew John Barrett, Charlotte, NC (US)

(73) Assignee: SOLENIS TECHNOLOGIES, L.P., Wilmington, DE (US)

( * ) Notice: Subject to any disclaimer, the term of this patent is extended or adjusted under 35 U.S.C. 154(b) by 78 days.

(21) Appl. No.: 16/196,540

(22) Filed: Nov. 20, 2018

(65) Prior Publication Data
US 2019/0153675 A1    May 23, 2019

Related U.S. Application Data

(60) Provisional application No. 62/589,261, filed on Nov. 21, 2017.

(51) Int. Cl.
| | |
|---|---|
| *D21H 21/02* | (2006.01) |
| *D21H 23/04* | (2006.01) |
| *G06T 7/60* | (2017.01) |
| *G06T 7/00* | (2017.01) |
| *D21H 23/78* | (2006.01) |
| *G06T 7/62* | (2017.01) |

(52) U.S. Cl.
CPC .............. *D21H 21/02* (2013.01); *D21H 23/04* (2013.01); *D21H 23/78* (2013.01); *G06T 7/0006* (2013.01); *G06T 7/60* (2013.01); *G06T 7/62* (2017.01); *G06T 2207/10056* (2013.01); *G06T 2207/30124* (2013.01)

(58) Field of Classification Search
USPC ........................................................ 162/158
See application file for complete search history.

(56) References Cited

U.S. PATENT DOCUMENTS

| | | |
|---|---|---|
| 5,266,166 A | 11/1993 | Dreisbach et al. |
| 5,512,137 A | 4/1996 | Shimizu et al. |
| 6,474,354 B2 | 11/2002 | Garver et al. |
| 7,067,244 B2 | 6/2006 | Jiang et al. |
| 7,842,165 B2 | 11/2010 | Shevchenko et al. |
| 7,909,963 B2 | 3/2011 | Di Cesare |
| 8,160,305 B2 | 4/2012 | Laurint et al. |
| 9,562,861 B2 | 2/2017 | Von Drasek et al. |
| 2009/0084510 A1 | 4/2009 | Perry et al. |
| 2009/0141963 A1 | 6/2009 | Laurint et al. |
| 2010/0012284 A1 | 1/2010 | Kaub |

FOREIGN PATENT DOCUMENTS

WO    2016208225 A1    12/2016

OTHER PUBLICATIONS

Murray, G., "Mechanism of pitch adsorption on carboxy methyl dextran surfaces," Appita Peer Reviewed, Jan. 2009, pp. 64-69, vol. 62, No. 1.
Fluid Imaging Technologies, Inc. "The Ultimate Guide to Flow Imaging Microscopy," Fluid Imaging Technologies E-book, pp. 1-20, downloaded Nov. 19, 2018.
ISA/US, International Search Report and Written Opinion issued in International Application No. PCT/US2018/061999, dated Feb. 5, 2019.

*Primary Examiner* — Mark Halpern
(74) *Attorney, Agent, or Firm* — Lorenz & Kopf, LLP (57) ABSTRACT

A method of measuring hydrophobic contaminants in a pulp slurry or a papermaking system includes the steps of providing an aqueous paper mill sample, filtering the aqueous paper mill sample to produce a filtrate comprising particles, and collecting an image of the particles in a measured volume of the filtrate. The method also includes the steps of analyzing the image to determine a size and morphology of the particles in the measured volume of filtrate, identifying spherical particles having a size of from about 1 micron to about 20 microns in the measured volume of filtrate, and quantifying a number of the spherical particles having the size of from about 1 micron to about 20 microns in the measured volume of filtrate. This method is useful for papermakers for deposition diagnostics, prevention, and contaminant control treatment optimization.

20 Claims, 3 Drawing Sheets

METHOD OF MEASURING HYDROPHOBIC CONTAMINANTS IN A PULP SLURRY OR A PAPERMAKING SYSTEM

CROSS-REFERENCE TO RELATED APPLICATIONS

This application claims the benefit of U.S. Provisional Application No. 62/589,261, filed Nov. 21, 2017, the contents of which are hereby expressly incorporated herein by reference.

TECHNICAL FIELD

The present disclosure generally relates to a method of measuring hydrophobic contaminants in a pulp slurry or papermaking process. More specifically, this disclosure relates to collecting an image of particles in a filtrate, analyzing the image to determine a size and morphology of the particles, and identifying and quantifying spherical particles having a size of from about 1 micron to about 20 microns.

BACKGROUND

Detection, quantification and monitoring of pitch is very important for pulping and papermaking. If not effectively controlled, the amounts of pitch can increase considerably in the papermaking process and cause increased consumption of chemical additives, formation of deposits on the surfaces of papermaking equipment, holes and other defects in the finished paper.

Hydrophobic contaminants in pulping and papermaking can be divided into two categories: those of natural origin like pitch and those of synthetic origin called stickies. Both pitch and stickies can create deposition and runnability issues. However, there are significant differences in those species.

Pitch is a tacky material which originates from wood. Pitch includes saponifyable fatty acid and resin acid esters and non-saponifyable species like betulin, beta-sitosterol, other sterols and fatty alcohols. Stickies are tacky hydrophobic species originating mainly from recycling processes. Stickies include hydrophobic species from coating binders, latex, waxes, hot melt adhesives, plastics, inks etc. Pitch and stickies differ not only by origin but also particle size. Stickies are usually larger and have particle sizes as large as 100 microns.

Pitch particles are significantly smaller than stickies particles and can have particle sizes as low as 0.1 μm (colloidal pitch), (see, e.g. Table 1 in G. Murray, K. Stack, D. S. McLean, W. Shen and G. Gamier: "Mechanism of pitch absorption on carboxymethyl dextran surfaces", Appita journal, V 62, No 1, 2009 pp 64-69). Dissolved or colloidal pitch is relatively stable in aqueous media. However, upon agglomeration, pitch particle size can increase from 0.1 to 1.0-10 μm and even 20 μm. While colloidal pitch having a particle size between 0.1 μm and 1.0 μm is stable, when that size is from 1.0 to 10 μm, agglomerated pitch particles can deposit if not fixated properly onto cellulose fibers. Therefore, it is important to be able to detect and count hydrophobic particles having a particle size of from 1 to 10 μm.

A variety of methods have been invented for measurements of hydrophobic contaminants in pulp and paper. U.S. Pat. No. 7,067,244 by Jiang et al discloses the application of enzymes, specifically lipase in quantification of free fatty acid content in the pulp or white water. Fatty acid content is measured by hydrolyzing triglycerides with enzyme, reacting hydrolysis products with specific regents to form measurable species and finally quantification of produced species spectrophotometrically.

U.S. Pat. No. 7,842,165 by Shevchenko et al discloses a method for monitoring the deposition of organic materials dispersed in an aqueous medium in a papermaking process by measuring the rate of deposition of the organic materials from the aqueous medium on-to a quartz crystal microbalance (QCM) having a top side contacting with the aqueous medium and a second bottom side isolated from the aqueous medium. The method detects the deposition mass build up over time and can detect deposition rate decline with addition of treatment, e.g. a surfactant.

U.S. Pat. No. 6,474,354 by Garver et al describes a method that can be utilized for measuring the propensity of colloids to deposit, to adsorb substances from solution or to aggregate. Colloidal particles are characterized by performing successive measurements of light attenuation or emission by a colloidal mixture at two or more temperatures and at one or more wavelength. The difference or ratio of the measurements at two or more temperatures provides a measure of the colloidal stability with respect to temperature.

U.S. Pat. No. 8,160,305 by Laurint et al describes an apparatus that can be used for measuring the depositability of particulate contaminants by using plastic film coated with adhesive. When placed in pulp or paper fluid stream the coated film can collect contaminants and the contaminants can be quantified by taking scanned images and analyzing those images with image analysis technique.

U.S. Pat. No. 5,512,137 by Yasubumi et al discloses a pulp slurry passed through flat mesh wire to form wet mat which is then pressed against a flat transparent plate and an image taken by CCD camera wherein impurities are measured per unit of wet mat area.

There are many methods described in the art on particle size measurements and particle count. Many of these methods are based on the detection of hydrophobic particles by means of light scattering and fluorescence. The stock samples are treated with a fluorescent probe first, which attaches itself to hydrophobic particles such as wood pitch and stickies. Then stained particles pass though the flow cell and are illuminated by laser. The resulting scattered light is detected providing size and count information. See for example WO2016208225, U.S. Pat. Nos. 9,562,861, 7,909, 963, US2010012284 which all use fluorescence for analysis.

Despite the existence of a variety of methods for detection and quantification of pitch and other hydrophobic particles, there is not an easy and straightforward process available. The process can depend on many parameters including temperature, pH, fiber quality, water quality, presence of other contaminants in the system, etc.

Several methods and techniques have been used for detection and quantification of hydrophobic contaminants. However, some of those methods can be quite efficient in detection and quantification of stickies but not sufficient for the detection of agglomerated pitch particles. This can be attributed to the method limitations in contaminant particle size detection. To be able to detect and quantify agglomerated pitch the method must be able to detect particles below 20 micron, in size, typically below 10 microns.

Therefore, remains a need for developing a method that allows for effective pitch detection, quantification and selection of effective pitch control agents. Furthermore, other desirable features and characteristics of the present disclosure will become apparent from the subsequent detailed description of the disclosure and the appended claims, taken in conjunction with the accompanying drawings and this background of the disclosure.

BRIEF SUMMARY

This disclosure provides a method of measuring hydrophobic contaminants in a pulp slurry or a papermaking system that includes the steps of providing an aqueous paper mill sample, filtering the aqueous paper mill sample to produce a filtrate comprising particles, and collecting an image of the particles in a measured volume of the filtrate. The method also includes the steps of analyzing the image to determine a size and morphology of the particles in the measured volume of filtrate, identifying spherical particles having a size of from about 1 micron to about 20 microns in the measured volume of filtrate, and quantifying a number of the spherical particles having the size of from about 1 micron to about 20 microns in the measured volume of filtrate.

This disclosure also provides a method of measuring hydrophobic contaminants in a pulp slurry or a papermaking system that includes the steps of providing an aqueous paper mill sample, filtering the aqueous paper mill sample to produce a filtrate comprising spherical particles having a circularity of about 0.66 or greater or an aspect ratio of about 0.9 or greater, and also a size of about 2 to about 5 microns, collecting an image of the spherical particles in a measured volume of the filtrate, analyzing the image to determine a size and morphology of the particles in the measured volume of filtrate, identifying the spherical particles having the size of about 2 to about 5 microns, and quantifying a number of the spherical particles having the size of about 2 to about 5 microns in the measured volume of filtrate.

This disclosure further provides a method of controlling hydrophobic contaminants in a pulp slurry or a papermaking process water that includes the steps of providing an aqueous paper mill sample, filtering the aqueous paper mill sample to produce a filtrate comprising particles, collecting an image of the particles in a measured volume of the filtrate, analyzing the image to determine a size and morphology of the particles in the measured volume of filtrate, identifying spherical particles having a size of from about 1 micron and about 20 microns in the measured volume of filtrate, quantifying the number of the spherical particles in the measured volume of filtrate, and adding at least one contaminant control agent to the papermaking system based on the number of spherical particles per a unit volume of filtrate.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the method of measuring hydrophobic contaminants in a pulp slurry or papermaking process. Furthermore, there is no intention to be bound by any theory presented in the preceding background or the following detailed description. Embodiments of the present disclosure are generally directed to a method of measuring hydrophobic contaminants in a pulp slurry or papermaking process. For the sake of brevity, conventional techniques related to such methods may not be described in detail herein. Moreover, the various tasks and process steps described herein may be incorporated into a more comprehensive procedure or process having additional steps or functionality not described in detail herein. In particular, various steps in the manufacture of pulp slurries or paper are well-known and so, in the interest of brevity, many conventional steps will only be mentioned briefly herein or will be omitted entirely without providing the well-known process details.

This disclosure describes, in various embodiments, the unexpected and surprising finding that hydrophobic contaminants such as pitch particles and microstickies tend to be spherical in shape and can be monitored and quantified by detecting spherical particles having a size of about 1 to about 20 microns. This produces results that are superior to what would otherwise be expected. The method of this disclosure is useful for papermakers for deposition diagnostics, prevention, and contaminant control treatment optimization.

This disclosure provides a method of measuring hydrophobic contaminants in a pulp slurry or a papermaking system. The pulp slurry or papermaking system may be any known in the art and is not particularly limited. The pulp slurries may be, for example, based on virgin pulp, deinked pulp (DIP), unbleached Kraft pulp (UBK), mechanical pulps like thermal mechanical pulp (TMP), semi-chemical mechanical pulps like neutral sulfite semi-chemical (NSSC), old corrugated containers (OCC), recovered newspaper, recovered tissue or other fiber sources.

In one embodiment, the method allows for optimization of pitch removal treatments to reduce and eliminate pitch or other hydrophobic contaminant related depositions in a pulp slurry or a papermaking system. Pitch monitoring and effective removal is important for papermaking processes. If not removed from the process, hydrophobic contaminants, such as pitch, can create deposits on the surfaces of papermaking machines and cause holes and other defects in the finished paper.

As first introduced above, contaminants can be of various types include pitch and stickies. Pitch typically originates from wood while stickies originate from other sources including recycling processes. Pitch particles are typically more difficult to detect than stickies because they tend to be smaller, e.g. less than 20 microns in size, e.g. about 1 to about 10 microns in size. Stickies tend to be larger than about 20 microns on size. Accordingly, this disclosure is typically directed towards detection and minimization of pitch particles. However, microstickies having particle sizes of less than about 20 microns can also be a focus of this disclosure. In other words, this disclosure may also be utilized to detect and minimize the presence of microstickies. The range of about 1 to about 10 micros tends to be important because pitch particles can exist in colloidal forms having sizes as low as about 100 to about 400 nanometers. At these sizes, the pitch particles tend to be stable and tend to not negatively affect the papermaking process. However, when pitch particles agglomerate and form larger particles, e.g. those having a size of from about 1 to about 10 or about 20 microns, they can cause problems, as first described above. For example, these particles can stick to the surface of the papermaking machines or form holes in the finished paper. Pitch particles and microstickies tend to be spherical in shape, as is described in greater detail below.

In another embodiment, the disclosure provides a method of detection and quantification of hydrophobic contaminants in pulping and papermaking process comprising the steps of collecting aqueous samples, such as cellulosic or pulp slurries, processing water from a papermaking process, waste water or effluent water from a paper making process, filtering a sample though a filter to remove cellulosic fiber and other large particles (e.g. having a size of about 20 microns or greater), collecting a filtrate, collecting images of particles in a fixed volume of the filtrate, identifying those particles that are spherical in shape and quantifying the number of spherical particles in the filtrate (hydrophobic contaminant particles).

In a further embodiment, the method allows for detection and quantification of hydrophobic contaminants, such as pitch, by identifying and measuring the number of spherical particles having a size of from about 1 to about 10 microns in an aqueous sample from a paper making process. The method is particularly useful for papermakers in terms of pitch deposition diagnostics and prevention, pitch control treatments selection and optimization.

In another embodiment, the disclosure provides a method of controlling pitch and other small hydrophobic contaminants comprising the steps of collecting aqueous paper mill samples, such as cellulosic or pulp slurries, processing water from a papermaking process, waste water or effluent water from a paper making process, filtering the sample though a filter to remove cellulosic fiber and other large particles (e.g. having a size of about 20 microns or greater), collecting the filtrate, collecting images of particles in a fixed volume of filtrate, identifying those particles that are spherical in shape and quantifying the number of spherical particles in the filtrate (hydrophobic contaminant particles), and adjusting the dosage of control agents added to the papermaking system based on the number of spherical particles per a unit volume of filtrate.

In a further embodiment, the disclosure provides a method of measuring hydrophobic contaminants in pulp slurry or papermaking system, comprising the steps of providing an aqueous paper mill sample, filtering the aqueous paper mill sample to produce a filtrate, collecting images of the particles in a measured volume of the filtrate, analyzing the image for size and morphology of the particles in the measured volume of filtrate, identifying spherical particles having a size of from about 1 micron to about 20 microns in the measured volume of filtrate, and quantifying the number of spherical particles having a size from about 1 micron to about 20 microns in the measured volume of filtrate.

The disclosure also provides a method of controlling hydrophobic contaminants in a pulp slurry or a papermaking process water, comprising providing an aqueous paper mill sample, filtering the aqueous paper mill sample to produce a filtrate, collecting images of the particles in a measured volume of the filtrate, analyzing the image for size and morphology of the particles in the measured volume of filtrate, identifying spherical particles having a size of from about 1 to about 20 microns in the measured volume of filtrate, quantifying the number of spherical particles having a size of from about 1 to about 20 microns in the measured volume of filtrate, and adding at least one contaminant control agent to the papermaking system based on the number of spherical particles per a unit volume of filtrate.

In various embodiments, the method includes the step of providing an aqueous paper mill sample. The aqueous paper mill sample may be any known in the art and may be taken from any portion of the paper mill such as at a headbox or tray or thickstock or effluent stream or pulping process. An aqueous paper mill sample can be a cellulosic slurry of process water collected from pulping or papermaking, papermaking process water, waste water or effluent water.

The method also typically includes the step of filtering the aqueous paper mill sample to produce a filtrate comprising particles. The step of filtering is also not particularly limited and may be further described filtering through a filter, e.g. a 25 micron filter. The goal of the step of filtering is to remove larger particles such that the instant method can more efficiently and effectively identify and quantify the particles of interest. For example, the sample is filtered to remove all or most of the cellulosic fiber prior to analysis. This prevents clogging the capillary in the measuring instrument. The step of filtering produces the filtrate which typically includes fines (such as small cellulosic fibers), fillers (e.g. crystals of calcium carbonate, or bentonite, or talc, or mineral additives), pitch particles, microstickies, etc. The pitch particles and microstickies are typically considered to be contaminants. Various types of particles are described below.

Paper mill sample filtrates contain particles of many different shapes: spherical or ellipsoidal, rod or fiber shape, amorphous and crystalline. The hydrophobic contaminants described herein include pitch. The method of this disclosure discovered that pitch particles and microstickies are spherical in shape. Similarly, the method also discovered that cellulosic fibers and fines are rod-like in shape and filler particles are crystalline in shape.

It was also discovered that pitch content in paper mill water filtrates correlates with the total number of spherical particles within a size range of from about 1 to about 20 µm, typically from about 1 to about 10 µm or from about 2 to about 5 microns. By counting the number of spherical particles in the specified size range (e.g. from about 1 to about 20 microns or typically from about 1 to about 10 microns or from about 2 to about 5 microns), one can quantify the amount of pitch or other small hydrophobic contaminants in the paper mill sample and make appropriate adjustments to contaminant or pitch control treatment levels. In other words, the method of this disclosure allows for measurement and ultimate treatment/control of contaminant levels in various processes. In various non-limiting embodiments, all values and ranges of values including and between those set forth above are hereby expressly contemplated for use herein.

Throughout this disclosure, it is contemplated that the spherical particles may have a size of about 1, 2, 3, 4, 5, 6, 7, 8, 9, 10, 11, 12, 13, 14, 15, 16, 17, 18, 19, or 20, microns, or any range thereof. In various non-limiting embodiments, all values and ranges of values including and between those set forth above are hereby expressly contemplated for use herein.

The method further typically includes the step of collecting an image of the particles in a measured volume of the filtrate. The image can be collected using any method known in the art. For example, any type of camera or imaging system may be used including those utilizing a microscope.

The method also typically includes the step of analyzing the image to determine a size and morphology of the particles in the measured volume of filtrate. Although there are various shapes of particles in the filtrate, it is the spherical particles that correlate to the quantity of pitch in the sample. The step of analyzing may be further defined as differentiating spherical particles from non-spherical particles. There are different ways to differentiate spherical particles from non-spherical. One example is counting particles with specific aspect ratio, where the aspect ratio of a perfect spherical particle is equal or close to 1.0. For the present disclosure an aspect ratio of greater than about 0.7 is considered circular or spherical, typically the aspect ratio is greater than 0.9. Aspect ratio is defined as the ratio of width to the height of an image. The alternative way could be circularity coefficient, wherein the circularity coefficient of spherical particles is equal or close to 1.0. Particles with circularity of 0.5 or greater, typically 0.66 and greater are counted as circular for this disclosure. One way to define circularity is to compute the perimeter of the measured particle and the area wherein the circularity is the inverse of compactness and the formula is $(4 \times \pi \times Area)/Perimeter$ (parameter definition from Flowcam Imaging Technology). Examples below demonstrate the applicability of the method in lab and paper mill trials. Hydrophobic contaminants can also include microstickies that are between 1 and 10 micron in size. In various non-limiting embodiments, all values and ranges of values including and between those set forth above are hereby expressly contemplated for use herein.

Further, the method typically includes the step of identifying spherical particles having a size of from about 1 micron to about 20 microns in the measured volume of filtrate. In the methods above the size of spherical particles measured can be from about 1 to about 10 microns or from about 2 to about 5 micron in size. The step of identifying may be further defined as identifying based on circularity and/or aspect ratio. The step of identifying may be completed using software tools to analyze the image. This software may be provided with the imaging technology or imaging apparatus and may be any known in the art. For example, the software may be able to analyze the image and determine which particles have a spherical shape, particle size, particle circularity, particle aspect ratio, etc. In various non-limiting embodiments, all values and ranges of values including and between those set forth above are hereby expressly contemplated for use herein.

In one embodiment, the spherical particles have a circularity of about 0.5 or greater. In another embodiment, the spherical particles have a circularity of about 0.66 or greater. In another embodiment, the spherical particles have an aspect ratio of about 0.7 or greater. In a further embodiment, the spherical particles have an aspect ratio of about 0.9 or greater. In yet another embodiment, the size of spherical particles is from about 1 to about 10 microns. In another embodiment, the size of spherical particles is from about 2 to about 5 microns. In various non-limiting embodiments, all values and ranges of values including and between those set forth above are hereby expressly contemplated for use herein.

The method also includes the step of quantifying a number of the spherical particles having the size of from about 1 micron to about 20 microns in the measured volume of filtrate. Typically, pitch or small hydrophobic contaminant load is quantified by measuring the number of particles within a specified size range, and with specified morphology in an aqueous paper mill sample. The step of quantifying may be further defined as quantifying based on circularity and/or aspect ratio.

Any one or more of the aforementioned steps may involve utilizing/collecting one image or more than one image. Typically, more than one image is collected, analyzed, and identified and then used to quantify the particles.

Any one or more of the aforementioned steps of imaging, identifying, quantifying, etc. can be performed using software tools. This software may be provided with the imaging technology or imaging apparatus and may be any known in the art. For example, the software may be able to analyze the image and quantify the particles based on which particles have a spherical shape, particle size, particle circularity, particle aspect ratio, etc.

One example of a technology useful in the disclosure is flow imaging microscopy, e.g. as available from Fluid Imaging Technology. The instrument used may be described as a flow imaging particle analyzer. This technology combines the benefits of digital imaging, flow cytometry, and microscopy into a single instrument to allow for quick and easy measurement of the size and shape of microscopic particles in a fluid medium. A flow imaging particle analyzer performs three functions all in one instrument. The flow imaging particle analyzer examines a fluid under a microscope, takes images of magnified particles within that fluid, and characterizes the particles using a variety of measurements. More specifically, a fluidics system uses an ultra-high-precision computer controlled syringe pump to pull a fluid sample through a flow cell perpendicular to an optical path. The optical system is similar to a microscope, and is used to capture real-time images of the particles in the fluid as they pass through a flow cell.

Any type of flow imaging microscopy or flow imaging particle analyzer known in the art can be used in this disclosure. In various non-limiting embodiments, flow imaging particle analyzers commercially available from Fluid Imaging Technology are used and are designed as FlowCAM V-SB-1 which is a benchtop model and Flow-CAM PV-100 which is a benchtop portable model. Moreover, any software known in the art can be used including, but not limited to, Integrated VisualSpreadsheet Analysis Software provided from Fluid Imaging Technology.

Moreover, in various non-limiting embodiments, it is expressly contemplated that the method of this disclosure may include any one or more method steps, process parameters, components, or apparatus as described in the publication entitled "The Ultimate Guide to Flow Imaging Microscopy" published by Fluid Imaging Technologies, Inc. of Scarborough, Me. The entirety of this document is expressly incorporated herein by reference in various non-limiting embodiments.

The method of this disclosure, e.g. using flow imaging microscopy, effectively detects and quantifies small particles from 1 μm to 3000 μm, specifically from 1 to 20 μm, more specifically from 1 to 10 μm. The method is based on collecting high resolution microscopic images of particles in a flow through capillary at a very rapid rate, e.g. up to 10,000 images per minute. Flow imaging microscopy provides a distribution of particle size and a picture and data on every particle measured. Flow imaging microscopy can provide information not only on particle size and count but also the particle shape. It is capable of differentiating particle shape morphology, curvature, elongation, and length/width ratio, etc. thereby identifying the spherical particle which correlate to the pitch in the system. Flow imaging microscopy not only provides particle size and count but also particle shape/morphology. Determining shape/morphology is important because it was discovered that pitch and microstickies tend to be spherical in shape. Determining shape/morphology allows one to quantify pitch and microstickies content and subsequently determine additional action steps.

Once the determination is made as to the quantity of pitch or other small hydrophobic contaminants present, a contaminant or pitch control agent can be added to reduce and or remove the contaminant or pitch from the system. The contaminant or pitch control agent can be a dispersing agent or a fixative agent. Any known contaminant control agent or pitch control agent can be used.

Fixative agent are generally highly charged cationic polymers examples include, but are not limited to, polydiallyldimethylammonium chloride (polydadmac), polyamines, cationic polyacrylamides, dimethylaminopropylacrylamide quaternized with methyl chloride (polydimapa), polyethyleneimine or combinations thereof. Dispersing agents generally comprise hydrophobically modified polymers, examples include, but are not limited to, hydrophobically modified polyethylene glycols, hydrophobically modified amino amides, hydrophobically modified hydroxyethycellulose ether (HMHEC) and combinations thereof. The possible pitch control agents includes but not limited to Detac™ DC779F, Detac™ 786C, Detac™ DC7225, Detac™ DC7445E, and Perform™ PC8229 all available from Solenis LLC (Wilmington, Del., USA). In one embodiment the contaminant control agent or pitch control agent is hydrophobically modified polyethylene glycol. In another embodiment, the contaminant control agent or pitch control agent is polydiallyldimethylammonium chloride, i.e., PolyDADMAC.

The quantity of pitch control agent added to the papermaking system can be adjusted based upon the quantity of pitch measured by the method of the disclosure. The pitch control agent is generally added in any amount of from about 0.5 to about 12 lb, about 1, 2, 3, 4, 5, 6, 7, 8, 9, 10, 11, or 12, lb, or typically from about 0.5 to about 7.0 lb, each per ton of dry furnish or dry pulp. The amount of contaminant control agent added to the papermaking system can be in an amount of from about 0.5 to about 121b, about 1, 2, 3, 4, 5, 6, 7, 8, 9, 10, 11, or 12, lb, or typically from about 0.5 to about 7.0 lb, each per ton of dry furnish or dry pulp. The contaminant control agent can include a dispersing agent and or a fixative agent. In various non-limiting embodiments, all values and ranges of values including and between those set forth above are hereby expressly contemplated for use herein.

In various embodiments, the method that can be used to optimize treatment levels of contaminant control agents, dispersing agent, fixative agents, etc. In other embodiments, the method can be used to evaluate the efficacy of different treatments to minimize pitch, microstickies, and/or other contaminants e.g. by use of contaminant control agents, dispersing agent, fixative agents, etc.

Additional Embodiments

This disclosure also provides a method of measuring hydrophobic contaminants in a pulp slurry or a papermaking system wherein the method includes the steps of providing an aqueous paper mill sample, filtering the aqueous paper mill sample to produce a filtrate comprising spherical particles having a circularity of about 0.66 or greater or an aspect ratio of about 0.9 or greater, and also a size of about 2 to about 5 microns, collecting an image of the spherical particles in a measured volume of the filtrate, analyzing the image to determine a size and morphology of the spherical particles in the measured volume of filtrate, identifying the spherical particles having the size of about 2 to about 5 microns, and quantifying a number of the spherical particles having the size of about 2 to about 5 microns in the measured volume of filtrate. In various non-limiting embodiments, all values and ranges of values including and between those set forth above are hereby expressly contemplated for use herein.

This method further provides a method of controlling hydrophobic contaminants in a pulp slurry or a papermaking process water wherein the method includes the steps of providing an aqueous paper mill sample, filtering the aqueous paper mill sample to produce a filtrate comprising particles, collecting an image of the particles in a measured volume of the filtrate, analyzing the image to determine a size and morphology of the particles in the measured volume of filtrate, identifying spherical particles having a size of from about 1 micron and about 20 microns in the measured volume of filtrate, quantifying the number of the spherical particles in the measured volume of filtrate, and adding at least one contaminant control agent to the papermaking system based on the number of spherical particles per a unit volume of filtrate. In various non-limiting embodiments, all values and ranges of values including and between those set forth above are hereby expressly contemplated for use herein.

EXAMPLES

The samples of the Examples are evaluated using flow imaging microscopy with a flow imaging particle analyzer that is commercially available from Fluid Imaging Technology. More specifically, a FlowCAM V-SB-1 and/or a FlowCAM PV-100 flow imaging particle analyzer is used. The data is analyzed using Integrated VisualSpreadsheet Analysis Software provided from Fluid Imaging Technology. Standard methods provided from Fluid Imaging Technology as part of the aforementioned software are utilized to produce the data set forth below and in the Figures.

Example 1

Several samples were prepared using bleached Kraft pulp and synthetic pitch. Synthetic pitch was prepared by blending oleic acid, abeitic acid and Pamak TP resin. Bleached Kraft pulp slurry was prepared at 0.5% consistency. A known amount of synthetic pitch was added to the slurry and then the slurry was filtered through a 25 micron filter.

The samples included a Control (Kraft pulp slurry filtrate with no additional pitch), two samples with the same filtrate furnished with an additional 50 ppm and 200 ppm synthetic pitch respectively, and two additional samples of filtrate and 50 ppm pitch and further treated with Treatment A (hydrophobically modified polyethylene glycol) and Treatment B (polydiallyldimethylammonium chloride, i.e., PolyDADMAC). Treatment A is a dispersing agent whereas Treatment B is fixative polymer.

Evaluation of these samples shows that the total particle count increases with addition of pitch (control vs samples with 50 and 200 ppm pitch). The addition of a dispersing agent such as Treatment A (hydrophobically modified polyethylene glycol) decreases the number of particles significantly as a large portion of the particles reduce in size below a detection limit of 2 microns. The addition of a fixative agent such as Treatment B (polydiallyldimethylammonium chloride, i.e., PolyDADMAC) results in the number of smaller particles declining and the number of larger particles (10 microns or greater) increasing. These results are set forth in Table 1 below.

Table 1 sets forth particle size distribution with addition of soluble pitch and pitch control agents.

TABLE 1

| Sample/Treatment | Particle Count Total | Particle Count 2-10 μm | Particle Count 10-20 μm | Particle Count 20-40 μm |
|---|---|---|---|---|
| Control | 6267 | 1447 | 56 | 6 |
| 50 ppm Pitch | 15854 | 3721 | 104 | 11 |
| 200 ppm Pitch | 38400 | 16337 | 817 | 240 |
| 50 ppm Pitch + 60 ppm Treatment A | 1172 | 384 | 4 | 0 |
| 50 ppm Pitch + 75 ppm Treatment B | 8358 | 2394 | 157 | 40 |

The same set of samples was analyzed to count the number of "spherical" and "rod" shape particles, checking the trends in the samples with different additional pitch load (0, 50 and 200 ppm). In these studies, particles with an aspect ratio of 0.9 and greater were counted as "spherical" and those of less than 0.2 were counted as "rod" shape particles. Analysis of the results (for 2 to 10 μm range) shows that the amount of "spherical" particles grows with an increase in pitch load. These results in are set forth in Table 1B below and also in FIG. 1. Table 1B sets forth total, spherical and rod type particles count within 2 to 10 micron range.

TABLE 1B

| Sample/Treatment | Total Count | Spherical Particles | Rod Shaped Particles |
|---|---|---|---|
| Control | 1447 | 114 | 784 |
| 50 ppm pitch | 3721 | 1354 | 1949 |
| 200 ppm pitch | 16337 | 8115 | 2645 |
| 50 ppm pitch + 60 ppm Treatment A | 384 | 84 | 87 |
| 50 ppm pitch + 75 ppm Treatment B | 2394 | 21 | 1631 |

Figure 1:
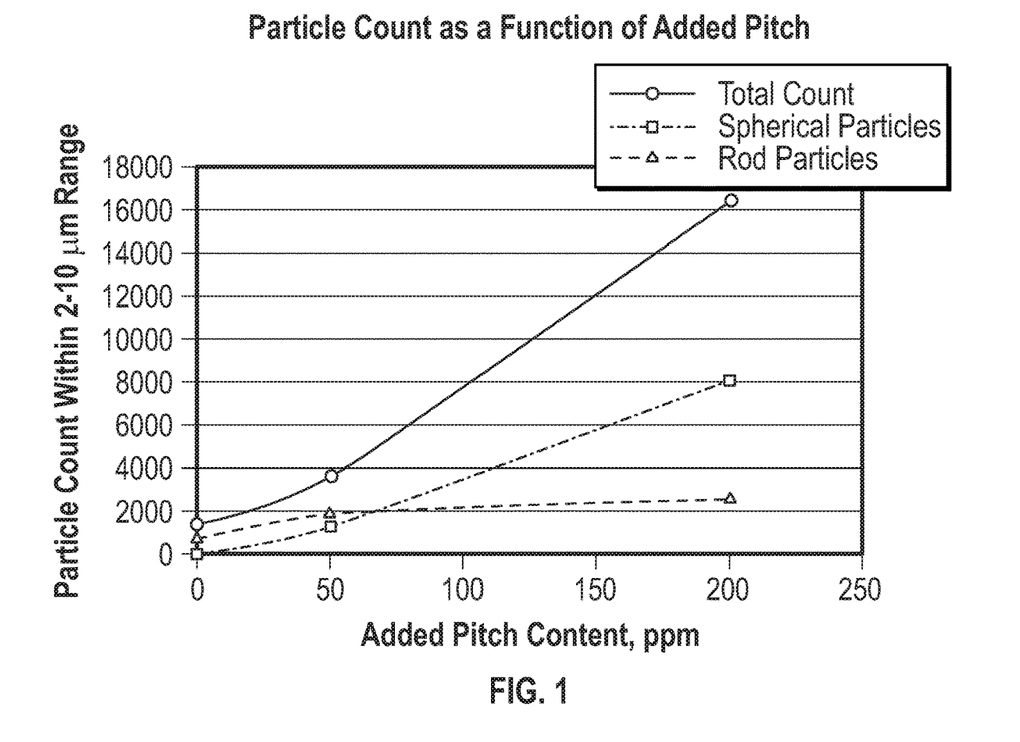
FIG. 1 is a line graph of total particle count, spherical particle count, and rod type particle count as a function of addition of soluble synthetic pitch (ppm) assed to a cellulosic pulp slurry.

Comparing 50 ppm added pitch and 200 ppm added pitch samples, it was found that the number of spherical particles grows six fold and then sharply declines with chemical treatments. In contrast to spherical particles, the number of "rod" type particles does not appreciably change with increased pitch content. Comparing the 50 ppm pitch addition to 200 ppm pitch addition sample shows that the curve for "rod" shaped particles count remains flat, e.g. as shown in FIG. 1. The "spherical"- and "rod"-shape morphologies can be associated with pitch and fiber, respectively. Therefore particle shape and count can be used in pitch monitoring and quantification.

Example 2

There are several ways to define and count number of spherical particles in pulp filtrates. Pulp samples, from different mills, were mixed with synthetic pitch. The resulting slurries were filtered through a 25 micron filter and the filtrates were analyzed for the number of spherical particles. In this set of samples, "spherical" particles were counted using a "circularity" parameter. Particles with circularity of 0.66 and greater were counted as spherical. The results of this analysis is set forth below in Table 2. Table 2 includes a spherical particle count within a 2 to 5 micron range using circularity parameter at 0.66 and greater.

TABLE 2

| Sample Number | Sample Description | # of Spherical Particles |
|---|---|---|
| 1 | Kraft pulp filtrate | 27,300 |
| 2 | Kraft pulp filtrate + 50 ppm pitch | 49,500 |
| 3 | Kraft pulp filtrate + 200 ppm pitch | 93,000 |
| 4 | Kraft pulp filtrate + 50 ppm pitch + 60 ppm Treatment A | 5,300 |
| 5 | Kraft pulp filtrate + 50 ppm pitch + 75 ppm Treatment B | 6,900 |

With an increase in synthetic pitch content, the number of particles grows close to 2 and 4 fold, respectively. The addition of chemical treatments results in sharp declines. The addition of a dispersing agent results in the number of particles declining due to the formation of smaller particles having a size smaller than the detection limit such that it appears that particles "disappear" from the investigated filtrate. In the case of addition of a fixative polymer product, the number of particles declines sharply due to formation of larger clusters, usually complexed with fiber shaped species.

Example 3

Figure 2:
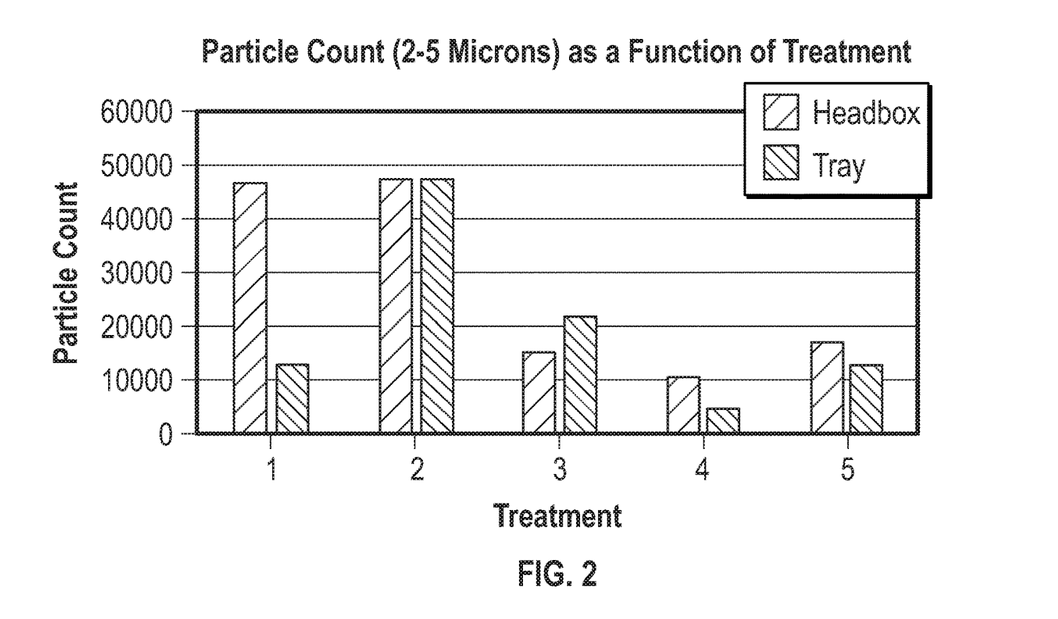
FIG. 2 is a bar graph of spherical, small pitch particle counts at a Headbox and a Tray in a paper mill setting utilizing hydrophobically modified polyethylene glycol or talc to control pitch levels in white water.

In a paper mill setting, hydrophobically modified polyethylene glycol was utilized to control pitch levels in white water. Small (2-5 microns) and large (5-10 microns) spherical particles were monitored both in the headbox and the tray waters. Particles with circularity of 0.66 and greater were counted as spherical. These results are set forth in Tables 3, 4 and 5 and FIGS. 2, 3, and 4.

The data indicate that, with the gradual reduction of the hydrophobically modified polyethylene glycol treatment dosage from 12 lb/ton to 4 lb/ton, the number of both small and large spherical particles declines to a minimum at about a 5 lb/ton treatment level. Table 3 and FIG. 2 includes spherical, small (2-5 micron) pitch particle counts in headbox and tray filtrates.

TABLE 3

| Sample Number | Treatment/Dosage | # of Particles Headbox | # of Particles Tray |
|---|---|---|---|
| 1 | 12 lb/ton -Talc | 47168 | 13104 |
| 2 | 12 lb/ton - hydrophobically modified polyethylene glycol | 48133 | 48085 |
| 3 | 9 lb/ton - hydrophobically modified polyethylene glycol | 15895 | 22566 |
| 4 | 5 lb/ton - hydrophobically modified polyethylene glycol | 11389 | 5302 |
| 5 | 4 lb/ton - hydrophobically modified polyethylene glycol | 18346 | 13745 |

Figure 3:
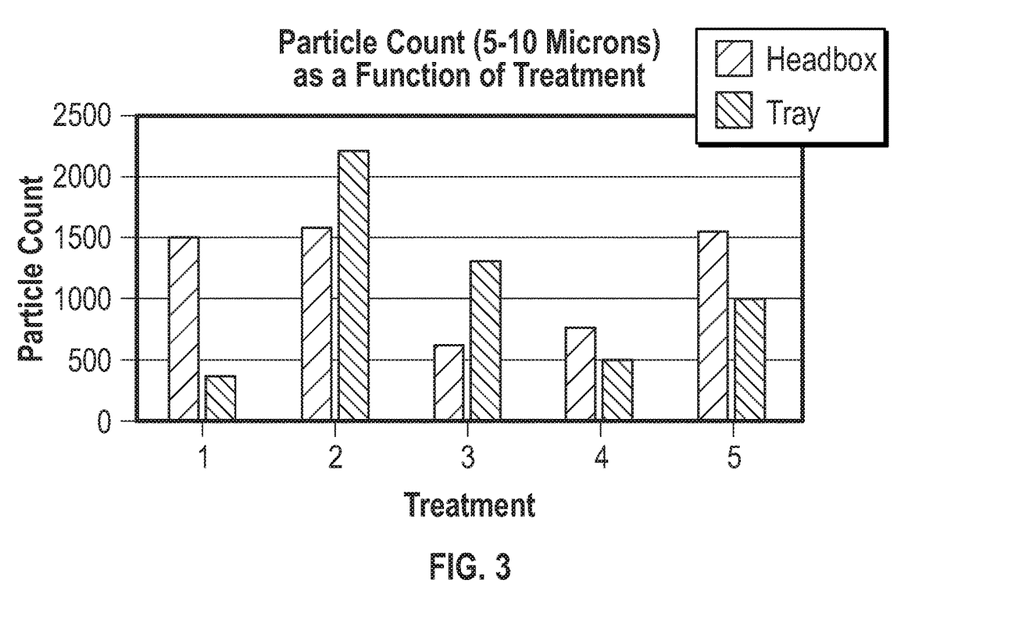
FIG. 3 is an additional bar graph of spherical, large pitch particle counts at a Headbox and a Tray in a paper mill setting utilizing hydrophobically modified polyethylene glycol or talc to control pitch levels in white water.

Table 4 and FIG. 3 includes spherical, large (5-10 micron) pitch particle counts in headbox and tray filtrates.

TABLE 4

| Sample Number | Treatment/Dosage | # of Particles Headbox | # of Particles Tray |
|---|---|---|---|
| 1 | 12/lb/ton - Talc | 1505 | 388 |
| 2 | 12 lb/ton - hydrophobically modified polyethylene glycol | 1601 | 2243 |
| 3 | 9 lb/ton - hydrophobically modified polyethylene glycol | 631 | 1325 |
| 4 | 5 lb/ton - hydrophobically modified polyethylene glycol | 781 | 501 |
| 5 | 4 lb/ton - hydrophobically modified polyethylene glycol | 1567 | 1010 |

Figure 4:
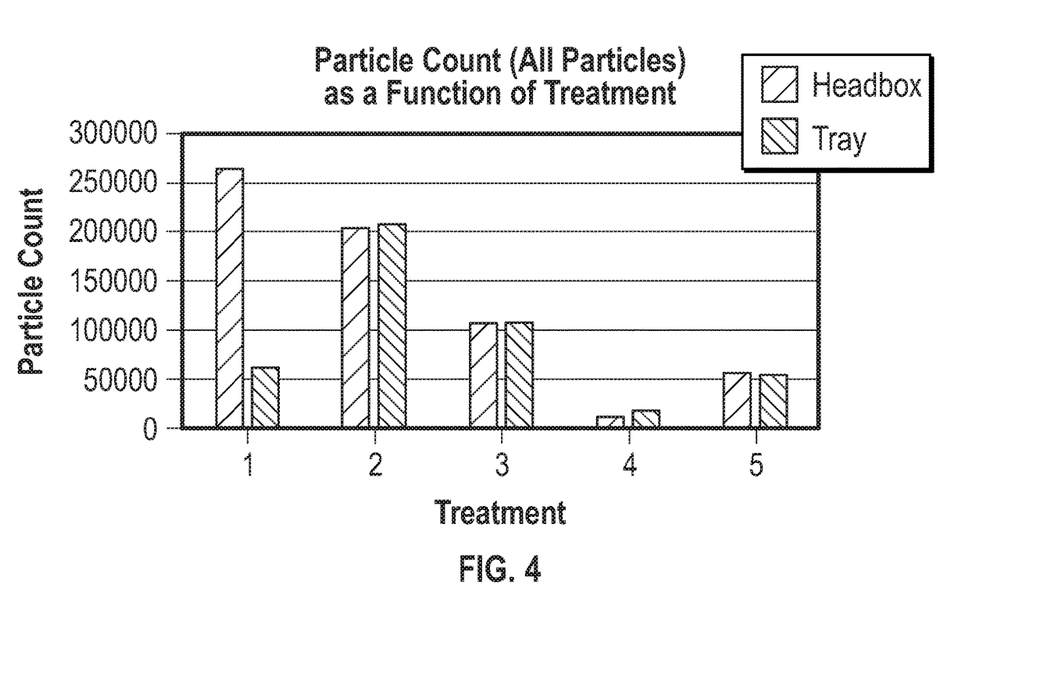
FIG. 4 is further bar graph of concentration of all particles at a Headbox and a Tray in a paper mill setting utilizing hydrophobically modified polyethylene glycol or talc to control pitch levels in white water.

Table 5 and FIG. 4 includes a concentration of all particles in Headbox and Tray filtrates.

TABLE 5

| Sample Number | Treatment/Dosage | # of Particles Headbox | # of Particles Tray |
|---|---|---|---|
| 1 | 12 lb/ton -Talc | 262982 | 62599 |
| 2 | 12 lb/ton - hydrophobically modified polyethylene glycol | 203706 | 208601 |
| 3 | 9 lb/ton - hydrophobically modified polyethylene glycol | 107425 | 109297 |
| 4 | 5 lb/ton - hydrophobically modified polyethylene glycol | 781 | 20433 |
| 5 | 4 lb/ton - hydrophobically modified polyethylene glycol | 57245 | 55364 |

By monitoring number of spherical particles, one can optimize (reduce or increase) chemical treatment dosage. It is also possible to compare efficiencies of different treatments (like Talc vs hydrophobically modified polyethylene glycol) utilizing the method of this disclosure.

Figure 5:
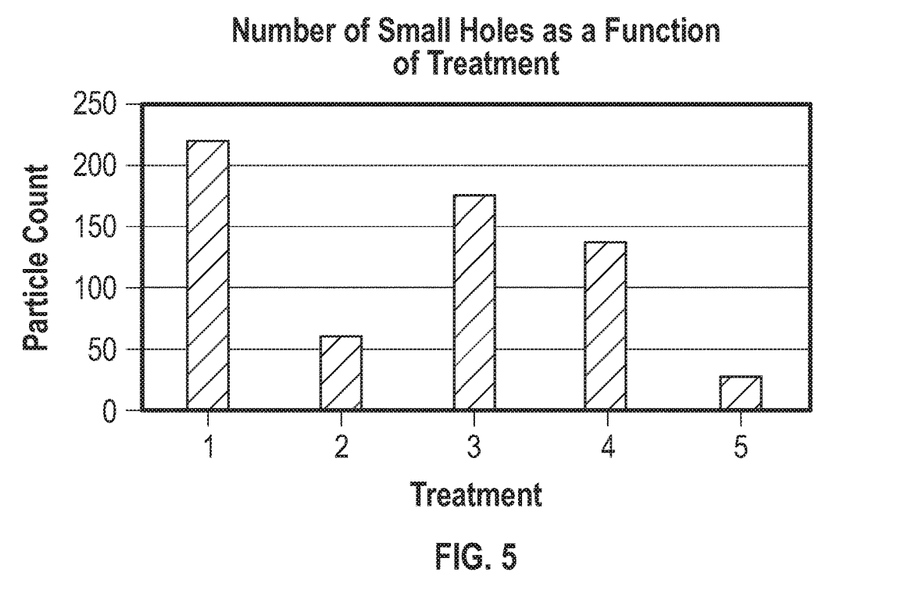
FIG. 5 is a bar graph of number of paper defects (small holes) as a function of pitch control product and dosage.

Additional small holes data was also collected for each dosage range tested. The small holes data consolidated for dosage is set forth in Table 6 and FIG. 5. The use of a pitch control product resulted in the decrease in the number of holes. Thus, a spherical particles count technique can be a used to optimize dosage of pitch control products to minimize the number of holes and other defects on forming paper. It is theorized that at 12 lb/ton hydrophobically modified polyethylene glycol the particles reduce in size to below the detection limit for the equipment. Table 6 shows the relationship between the number of paper defects (small holes) on pitch control product and dosage.

TABLE 6

| Sample Number | Treatment/Dosage | Number of Small Holes |
|---|---|---|
| 1 | 12 lb/ton -Talc | 219 |
| 2 | 12 lb/ton - hydrophobically modified polyethylene glycol | 53 |
| 3 | 9 lb/ton - hydrophobically modified polyethylene glycol | 174 |
| 4 | 5 lb/ton - hydrophobically modified polyethylene glycol | 144 |
| 5 | 4 lb/ton - hydrophobically modified polyethylene glycol | 27 |

Example 4

Spherical particle concentrations of from 2 to 5 microns were measured in mill water samples from a paper machine headbox along with MPV print counts. Particles with circularity of 0.66 and greater were counted as spherical. The MVP print count value is a measure of the number of print defects in a paper sample, utilizing an MVP printing press to print the paper.

More specifically, paper samples are threaded through an MVP printing press and 1 impression is printed at each 500-sheet interval for a total of 10,000 impressions. The surface contaminations are counted as the impressions are collected. The contaminations can then be classified, using a tape to remove contaminants from the blanket on the press. This allows for microscopic identification of specific contaminants, including pitch.

Figure 6:
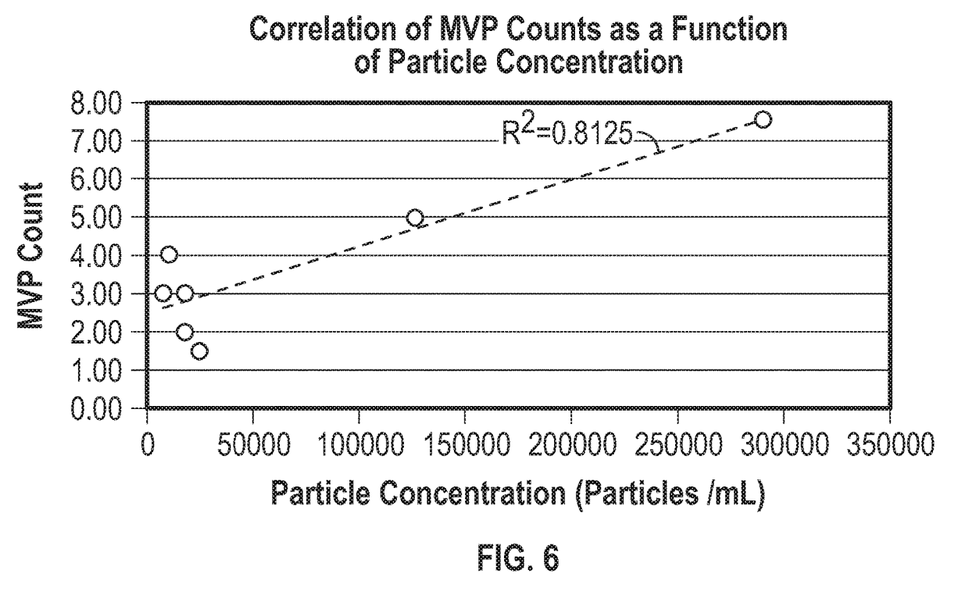
FIG. 6 is a graph of correlation of MVP counts and number of spherical hydrophobic particles in headbox white water.

The data show a positive correlation between MVP counts and number of spherical particles within 2 to 5 microns. Upon decrease in spherical particle count (within 2 to 5 micron range) MPV count also declined in a linear fashion, see results in Table 7 and FIG. 6. Table 7 shows the correlation of MVP counts and number of spherical hydrophobic particles in headbox white water of a paper machine.

TABLE 7

| MVP Count | Particle Concentration |
|---|---|
| 7.5 | 288741 |
| 5 | 125272 |
| 4 | 9059 |
| 3 | 6185 |
| 3 | 16909 |
| 1.5 | 23448 |
| 2 | 15441 |

When MVP count is high (e.g. 5 and above), the spherical particle concentration is high (more than 100,000). When MVP count is low (e.g. 3 or below), the spherical particle count is 5 to 10 times lower.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment. It being understood that various changes may be made in the function and arrangement of elements described in an exemplary embodiment without departing from the scope as set forth in the appended claims.

What is claimed is:

1. A method of measuring hydrophobic contaminants in a pulp slurry or a papermaking system, said method comprising the steps of:
   providing an aqueous paper mill sample,
   filtering the aqueous paper mill sample to produce a filtrate comprising particles,
   collecting an image of the particles in a measured volume of the filtrate,
   analyzing the image to determine a size and morphology of the particles in the measured volume of filtrate,
   identifying spherical particles having a size of from 1 micron to 10 microns, having a circularity of 0.5 or greater, and having an aspect ratio of 0.7 or greater, in the measured volume of filtrate, and
   quantifying a number of the spherical particles having the size of from 1 micron to 10 microns in the measured volume of filtrate.

2. The method of claim 1 wherein the hydrophobic contaminants comprise pitch.

3. The method of claim 2 wherein the spherical particles have an aspect ratio of 0.9 or greater.

4. The method of claim 1 wherein the spherical particles have a circularity of 0.66 or greater.

5. The method of claim 1 wherein the spherical particles have an aspect ratio of 0.9 or greater.

6. The method of claim 1 wherein the size of the spherical particles is from 2 to 5 microns.

7. The method of claim 1 wherein the step of collecting an image is further defined as collecting an image using flow imaging microscopy.

8. The method of claim 1 wherein the spherical particles have a size of 1 to 9 microns, a circularity of 0.66 or greater, an aspect ratio of 0.9 or greater, and a size of about 2 to 5 microns, wherein the circularity is calculated using the formula:
circularity=$(4 \times \pi \times)$/perimeter.

9. The method of claim 1 wherein the hydrophobic contaminants comprise pitch, wherein the spherical particles have a circularity of 0.66 or greater, an aspect ratio of 0.9 or greater, and a size of 2 to 5 microns, wherein the circularity is calculated using the formula: circularity=$(4 \times \pi \times area)$/perimeter, and wherein the step of collecting an image is further defined as collecting an image using flow imaging microscopy.

10. A method of measuring hydrophobic contaminants in a pulp slurry or a papermaking system, said method comprising the steps of:
providing an aqueous paper mill sample,
filtering the aqueous paper mill sample to produce a filtrate comprising spherical particles having a circularity of 0.66 or greater or an aspect ratio of 0.9 or greater, and also a size of 2 to 5 microns,
collecting an image of the spherical particles in a measured volume of the filtrate,
analyzing the image to determine a size and morphology of the spherical particles in the measured volume of filtrate,
identifying the spherical particles having the size of 2 to about 5 microns, and
quantifying a number of the spherical particles having the size of 2 to 5 microns in the measured volume of filtrate,
wherein the circularity is calculated using the formula: circularity=$(4 \times \pi \times area)$/perimeter.

11. A method of controlling hydrophobic contaminants in a pulp slurry or a papermaking process water, said method comprising the steps of:
providing an aqueous paper mill sample,
filtering the aqueous paper mill sample to produce a filtrate comprising particles,
collecting an image of the particles in a measured volume of the filtrate,
analyzing the image to determine a size and morphology of the particles in the measured volume of filtrate,
identifying spherical particles having a size of from about 1 micron to 10 microns, having a circularity of 0.5 or greater, and having an aspect ratio of 0.7 or greater, in the measured volume of filtrate,
quantifying the number of the spherical particles in the measured volume of filtrate, and
adding at least one contaminant control agent to the papermaking system based on the number of spherical particles per a unit volume of filtrate,
wherein the circularity is calculated using the formula: circularity=$(4 \times \pi \times area)$/perimeter.

12. The method of claim 11 wherein the contaminant control agent is added in an amount of from 0.5 to 12 lb per ton of dry pulp.

13. The method of claim 11 wherein the contaminant control agent is added in an amount of from 0.5 to 7.0 lb per ton of dry pulp.

14. The method of claim 11 wherein the contaminant control agent comprises a dispersing agent.

15. The method of claim 11 wherein the contaminant control agent comprises a fixative agent.

16. The method of claim 11 wherein the hydrophobic contaminants comprise pitch.

17. The method of claim 11 wherein the hydrophobic contaminants comprise pitch and the spherical particles have a circularity of 0.66 or greater.

18. The method of claim 11 wherein the spherical particles have an aspect ratio of 0.9 or greater.

19. The method of claim 11 wherein the step of collecting an image is further defined as collecting an image using flow imaging microscopy.

20. The method of claim 11 wherein the spherical particles have a circularity of 0.66 or greater, an aspect ratio of 0.9 or greater, and a size of 2 to 5 microns, wherein the circularity is calculated using the formula: circularity=$(4 \times \pi \times area)$/perimeter.

* * * * *